(12) United States Patent
Böffgen et al.

(10) Patent No.: US 11,055,064 B2
(45) Date of Patent: Jul. 6, 2021

(54) TESTING OF PHYSICAL RANDOM NUMBER GENERATORS

(71) Applicant: Siemens Aktiengesellshaft, Munich (DE)

(72) Inventors: Pascale Böffgen, Munich (DE); Markus Dichtl, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 130 days.

(21) Appl. No.: 16/268,530

(22) Filed: Feb. 6, 2019

(65) Prior Publication Data

US 2019/0250890 A1  Aug. 15, 2019

(30) Foreign Application Priority Data

Feb. 12, 2018 (EP) ..................... 18156308
Feb. 16, 2018 (EP) ..................... 18157168

(51) Int. Cl.
*G06F 7/58* (2006.01)
*G06F 17/18* (2006.01)

(52) U.S. Cl.
CPC ............... *G06F 7/588* (2013.01); *G06F 7/58* (2013.01); *G06F 17/18* (2013.01)

(58) Field of Classification Search
CPC ................... G06F 7/58; G06F 7/588
See application file for complete search history.

(56) References Cited

U.S. PATENT DOCUMENTS

| | | | |
|---|---|---|---|
| 2004/0263320 A1* | 12/2004 | Bardouillet | G06F 7/58 340/146.2 |
| 2006/0067527 A1* | 3/2006 | Urivskiy | H04L 9/0662 380/46 |
| 2014/0279813 A1 | 9/2014 | Vasyltsov | |
| 2015/0149519 A1 | 5/2015 | Kokubo et al. | |
| 2015/0199174 A1* | 7/2015 | Boehl | G06F 7/58 708/203 |

OTHER PUBLICATIONS

Cachin, Christian. Entropy measures and unconditional security in cryptography. Diss. 1997; 1997.
Wolfgang Killmann—BSI guideline AIS 31 "A proposal for: Functionality classes of random number generators", version 2.0, Sep. 18, 2011; 2011.

(Continued)

*Primary Examiner* — Chuong D Ngo
(74) *Attorney, Agent, or Firm* — Schmeiser, Olsen & Watts LLP (57) ABSTRACT

An automated system is provided. Examples of automated systems include processors for calculation which implement a secure boot process based on the plurality of numbers; chip cards for authentication; telecommunication equipment; programmable logic controllers, control devices for railways, etc. The operation is controlled depending on whether a sequential test for randomness of a plurality of numbers from a physical random number generator is marked as failed. This has the advantage that an online-test for integrity of the plurality of numbers is possible at a high accuracy and low latency.

11 Claims, 7 Drawing Sheets

(56) References Cited

OTHER PUBLICATIONS

Jan Krhovják et al: "The Sources of Randomness in Mobile Devices", Proceeding of the 12th Nordic Workshop on Secure IT Systems, Jan. 1, 2007 (Jan. 1, 2007), pp. 1-12; XP055498422; 2007.
Eberhard Böhl: "Simple true random number generator for any semi-conductor technology", IET Computers and Digital Techniques, vol. 8, No. 6, Nov. 1, 2014 (Nov. 1, 2014), pp. 239-245, XP055498670, Michael Faraday House, Six Hills Way, Stevenage, Herts. SGI 2AY, UK ISSN: 1751-8601, DOI: 10.1049/iet-cdt.2014.0029; 2014.
Wald, Abraham. "Sequential tests of statistical hypotheses." The annals of mathematical statistics 16.2 (1945): 117-186; 1945.
UCSD: "Physics Lectures UCSD University—Chapter 1 Probability", . Jan. 1, 2010 (Jan 1, 2010), XP055498906; Retrieved from the Internet: URL:https://courses.physics.ucsd.edu/2010/ Spring/physics210a/LECTURES/CH01.pdf; 2010.

\* cited by examiner

TESTING OF PHYSICAL RANDOM NUMBER GENERATORS

CROSS-REFERENCE TO RELATED APPLICATION

This application claims priority to European application No. 18157168.8, having a filing date of Feb. 16, 2018 and European Application No. 18156308.1, having a filing date of Feb. 12, 2018, the entire contents both of which are hereby incorporated by reference.

FIELD OF TECHNOLOGY

The following relates to testing randomness of numbers generated by a physical random number generator. Various examples of the following specifically relate to testing the randomness in an efficient and accurate manner.

BACKGROUND

Random number generators (RNGs) sequentially generate a plurality of numbers. The corresponding sequence of numbers is expected to be random. A quantitative measure for the statistical quality of the RNG is required in order to verify whether the RNG works correctly.

One realization of RNGs are physical random number generators (physical RNGs. Physical RNGs are built to generate a plurality of numbers using a physical process. Physical RNGs are required for many security applications. Example physical processes that are typically used for physical RNGs include: noise such as thermal noise, oscillation jitter and quantum phenomena.

RNGs are part of many automated systems and are often required for secure cryptographic applications. It essentially depends on the quality of the random numbers generated whether the automated systems work correctly. Hence, the quality of RNGs, specifically of physical RNGs, is typically required to be supervised. For example, the BSI guideline AIS 31 (Bundesamt für Sicherheit in der Informationstechnik: "A proposal for: Functionality classes of random number generators", version 2.0, 18.9.2011), requires the permanent supervision of physical RNGs.

However, existing tests for randomness of a plurality of sequentially generated numbers obtained from an RNG face certain restrictions and drawbacks.

For example, existing tests for randomness may require a significant complexity of implementation. Thus, they may require significant computational resources, e.g., in terms of processing power and/or memory.

For example, existing tests for randomness may have a limited accuracy. The uncertainty of a result of the test may be significant.

For example, a tradeoff between accuracy and timeliness of the result of the test cannot be resolved easily. If the test is to obtain the result at high accuracy, a large amount of numbers needs to be generated before applying the test. This takes significant time. Security breaches due to insufficient quality of the RNG cannot be detected quickly. Existing tests are either optimized for accuracy or for timeliness.

SUMMARY

An aspect relates to testing for randomness of sequentially generated numbers. Specifically, a need exists for advanced techniques which overcome or mitigate at least some of the above-identified restrictions and drawbacks.

A method includes obtaining a plurality of numbers from a physical RNG. The method also includes taking at least one observation on the plurality of numbers. The at least one observation is associated with a test for randomness. The method also includes selectively marking the test as failed, depending on a result of the at least one observation. The method also includes controlling an operation of an automated system depending on whether the test is marked as failed. The taking of the at least one observation includes calculating a value indicative of a Renyi-entropy measure for the plurality of numbers.

Obtaining the plurality of numbers may correspond to receiving the plurality of numbers from the physical RNG. Obtaining the numbers may include writing the plurality of numbers to a memory, i.e., buffering the plurality of numbers. In some examples, it would be possible that taking the at least one observation commences in response to obtaining the plurality of numbers, e.g., at a point in time at which all numbers of the plurality of numbers are available in the memory. In other examples, it would be possible to commence taking the at least one observation while obtaining the plurality of numbers. For the min entropy, the latter scenario may be implemented in the following way: For each possible value of the numbers, a counter is initialized to 0 and incremented by 1 whenever this value occurs. A variable max, to contain the maximum value, is initialized to 0. Each time a counter is incremented, the new value of the counter is compared to max. If the new value of the incremented counter is larger than max, max is set to this new value. The observation is derived from the value of max.

The method may further include the physical RNG sequentially generating the plurality of numbers. The plurality of numbers may be generated over a certain time duration/time period.

The plurality of numbers may be obtained as a digital signal. For example, each number may have a certain length, e.g., 1 bit, 8 bits, 32 bits, etc. The range of available values of the numbers correlates with the length of the numbers.

The plurality of numbers may be obtained and/or generated sequentially; hence, the plurality of numbers may define a sequence of numbers. Each number of the plurality of numbers may be associated with a sequence number.

In some examples, the test may consist of a single observation. Then, e.g., a single value indicative of the Renyi-entropy measure may be obtained. In other examples, the test may comprise a plurality of observations that are taken one after another.

Selectively marking the test may correspond to: marking the test as failed or not marking the test as failed. For example, the test may be marked as failed or marked as passed.

By making the subsequent behavior of the automated system—which uses the plurality of numbers—depend on the test result an online test for randomness can be implemented. The online test is typically distinguished from an offline test. Typically, the offline test is executed as a backend test when producing the physical RNG. Differently, an online test is used during the intended use of the physical RNG, i.e., when employing a system including, both, the physical RNG and an automated system relying on the plurality of numbers output by the physical RNG.

For example, the operation of the automated system may use the plurality of numbers. In some examples, the operation of the automated system using the plurality of numbers may be aborted if the test is marked as failed. Other measures of controlling the operation are conceivable.

It has been found that using the value indicative of the Renyi-entropy measure provides for a resource efficient implementation of the test. This helps to reduce the time required to conduct the test (test time). The result of the test can be provided with limited computational resources.

As a general rule, various Renyi-entropy measures are available. A specific Renyi-entropy measure that was found to support short test times with limited computational resources is the min-entropy.

An example of a Renyi-entropy measure includes the min-entropy. The min-entropy is the smallest of the Renyi-entropies. It provides for a measure of the unpredictability of a set of outcomes, because it is the negative logarithm of the probability of the most likely outcome. A smaller min-entropy corresponds to smaller randomness.

Examples of Renyi-entropy measures and min-entropy measures are described, e.g., in: Cachin, Christian. Entropy measures and unconditional security in cryptography. Diss. 1997.

To determine the value which is indicative of the min-entropy, it would be possible to select the most often occurring value of the plurality of numbers and to determine the count of the selected value as the result of the at least one observation. Thereby, it is possible to quantify the min-entropy optimally, to thereby facilitate taking the right decision when modifying the subsequent behavior of the automated system.

In this regard, it would be possible to compare the result of the at least one observation—e.g., the count of the most-often occurring value—with a predefined threshold. As such, the predefined threshold corresponds to an entropy.

The predefined threshold could be associated with a test criterion. The test criterion can specify the targets of the test, e.g., in terms of quality of the physical RNG, nominal accuracy of the test, test time required for the test, etc.

The predefined threshold could be associated with a minimum min-entropy that is still acceptable. Thus, when the count of the most-often occurring value exceeds the predefined threshold, this may correspond to a min-entropy which is too small to be acceptable. Then, the test may be marked as failed.

In some scenarios, it may be sufficient to determine the value such that it is indicative of an upper bound of the Renyi-entropy measure, e.g., of the min-entropy measure.

Specifically, this may include checking if any occurring value of the plurality of numbers exceeds a predefined buffer threshold.

Then, prior to completing the test by processing all obtained numbers, the test may be aborted. For example, the test may be marked as failed—even prior to having processed all numbers of the plurality of numbers. The particular sequence number of the number which has the value that leads to exceeding the predefined buffer threshold may be a-priori unknown. Hence, the particular count of processed numbers may be a-priori undefined and may be smaller than all available numbers. In this regard, the test for randomness may be referred to as a sequential test.

Details with respect to the sequential test are described, e.g., in Wald, Abraham. "Sequential tests of statistical hypotheses." The annals of mathematical statistics 16.2 (1945): 117-186.

For example, the test may be marked as failed if the probability of the min-entropy measure being larger than a given threshold is sufficiently small; thus the given threshold can be said to correspond to an upper bound. In other words: if the min-entropy measure, based on the available observations and at a sufficiently large probability, is smaller than the upper bound, then the test can be marked as fails.

Employing such an approximation of the Renyi-entropy measure by relying on an upper bound has certain advantageous effects. First, the test time can be reduced by pre-maturely aborting the test. Second, the computational resources required for performing the test, specifically the memory size, can be reduced. For example, certain memory allocations can be limited in accordance with the buffer threshold. The memory allocations need not be dimensioned to be able to reflect all possible entropy measures, but rather can be allocated to reflect upper bound of the Renyi-entropy measure associated with the buffer threshold. This facilitates resource-efficient online tests.

A computer program product (non-transitory computer readable storage medium having instructions, which when executed by a processor, perform actions) or a computer program includes program code that can be executed by control circuitry. Executing the program code causes the control circuitry to perform a method. The method includes obtaining a plurality of numbers from a physical RNG. The method also includes taking at least one observation on the plurality of numbers. The at least one observation is associated with a test for randomness. The method also includes selectively marking the test as failed, depending on a result of the at least one observation. The method also includes controlling an operation of an automated system depending on whether the test is marked as failed. The taking of the at least one observation includes calculating a value indicative of a Renyi-entropy measure for the plurality of numbers.

A device includes control circuitry configured to perform: obtaining a plurality of numbers from a physical RNG; and taking at least one observation on the plurality of numbers, the at least one observation being associated with a test for randomness; and depending on a result of the at least one observation, selectively marking the test as failed; and—controlling an operation of an automated system depending on whether the test is marked as failed. Said taking of the at least one observation includes calculating a value indicative of a Renyi-entropy measure for the plurality of numbers.

Above, techniques of implementing a test for randomness have been described, wherein the test relies on a value indicative of a Renyi-entropy measure. According to certain examples, it would be possible to re-take observations of a test for randomness—e.g., a test relying on a value indicative of a Renyi-entropy measure—for multiple iterations while obtaining and/or generating a plurality of numbers. Then, any such iteration/observation may lead to marking the test as failed. Such a test may again be referred to as a sequential test, because the particular iteration/observation that leads to marking the test as failed—if any—is not known a-priori.

A method includes sequentially obtaining a plurality of numbers from a physical RNG. The method also includes, while obtaining the plurality of numbers, repeatedly taking observations on the respectively obtained numbers. The observations are associated with the sequential test for randomness. Then, the method further includes, for each observation: selectively marking the sequential test as failed, depending on a result of the respective observation.

As a general rule, the method may be applied as an online test and/or as an offline test.

The sequential test can help to check whether the plurality of numbers are obtained and/or generated in a random manner.

The sequential test may include a plurality of iterations. Each iteration may be associated with a respective observation. Each observation of the sequential test may operate on all or at least some of the numbers that have been obtained at the time of taking the respective observation. Hence, in other words, a proceeding observation will operate on a first set of numbers and a succeeding observation will operate on a second set of numbers, wherein the second set of numbers fully includes the first set of numbers. Hence, in more generic terms, the decision basis on which a result of the observations is formed may increase from observation to observation.

The count of observations of the sequential test may not be determined a-priori, i.e., when commencing to apply the sequential test. I.e., the particular given observation that leads to marking the sequential test as failed—if any—may not be determined a-priori at the beginning of the sequential test. In other words, the count of numbers associated with the given observation that leads to marking the sequential test as failed may not be determined a-priori. In still other words, a sequence number of the iteration which leads to marking the sequential test as failed may not be determined a-priori.

The number of observations of the sequential test, in other words, is not predetermined, but is rather a random quantity. This is because it is possible to selectively mark the sequential test as failed depending on the result of a given iteration of the sequential test.

Using a sequential test to test a plurality of numbers obtained from a physical RNG for randomness has certain advantages. Specifically, it is possible to commence testing early throughout generation and obtaining of the plurality of numbers. For example, reference techniques of testing a plurality of numbers obtained from a physical RNG for randomness typically require a comparably large count of numbers to operate on; example counts may be in the order of A=1.000 or A=10.000. Differently, using a sequential test can help to start testing for randomness at an earlier stage of obtaining and/or generating the plurality of numbers. For example, a first, initial observation of the sequential test may be taken for a sequence number of, e.g., A=4 or 5 or 10 of the respectively generated numbers. Thus, according to the techniques described herein it is not required to wait for the generation of the plurality of numbers to complete; rather, it is already possible to apply the test based on a subset of the plurality of numbers. This helps to reduce the test time. This helps to obtain a first measure for the randomness of the plurality of numbers comparably quickly. This may be particularly helpful where the operation of an automated system uses the plurality of numbers and non-random numbers would result in a breach of security—in an online test scenario. Also, backend testing can be shortened, thereby increasing production throughput—in an offline test scenario.

In some examples, said sequentially obtaining of the plurality of numbers and, optionally, the sequential generation of the plurality of numbers can be aborted pre-maturely, i.e., prior to obtaining and/or generating the number of the plurality of numbers having the highest sequence number.

Then, in response to marking the sequential test as failed, it would generally be possible to control the automated system appropriately. One example includes aborting the operation of the automated system using the plurality of numbers. For example, the automated system may be transitioned into a secure state. This corresponds to an online test scenario.

Such aborting of the operation of the automated system and aborting the obtaining/generating of the plurality of numbers are only two examples of possible countermeasures that can be taken in response to marking the sequential test as failed. As a general rule, various countermeasures may be taken, including, e.g.: outputting a warning message, repeating the test, etc. Countermeasures may vary for an offline test scenario and an online test scenario.

The method may include comparing a result of the respective observation with the respective predefined threshold, for each observation. Then, the sequential test may be selectively marked as failed, depending on said comparing.

The predefined threshold may be associated with the test criterion. The choice of the predefined threshold may specify a strictness of the sequential test.

As a general rule, the reliability of the sequential test may tend to increase for an increasing sequence number of the obtained plurality of numbers. In other words, the reliability of the sequential test may have a tendency to increase for a larger count of observations.

Based on this finding, various options are available to avoid overly strict marking of the sequential test as failed for early iterations of the sequential test.

A strategy in this regard may include adjusting the choice of the predefined threshold over the course of the sequential test. The predefined threshold may be adjusted from observation to observation, e.g., for all observations or at least some observations. Hence, the test criterion of the sequential test may vary across the observations. For example, it would be possible that, for each observation, the respective predefined threshold depends on the count of obtained numbers associated with the respective observations. For example, a large count (small count) of numbers based on which the respective observation operates may result in a stricter (less strict) predefined threshold. Thereby, specifically, the limited accuracy of early iterations can be compensated. By adjusting the test criterion, a balance between early decision-making on the one hand side and accuracy of the test on the other hand can be tailored. For example, the predefined thresholds may be chosen such that the predefined thresholds associated with the observations correspond to a nominal fail probability of the sequential test which does not vary more than 50% across the observations, optionally not more than 20%, further optionally not more than 5%. The nominal fail probability may be defined as the fail probability of the test for an ideal RNG. Hence, where an ideal physical RNG outputs random numbers, the test may be falsely marked as failed.

A still further strategy in this regard may include commencing to repeatedly take the observations when the count of respectively obtained numbers exceeds a lower threshold. Hence, for small sequence numbers, no observations may be taken, thereby attributing to the limited accuracy of such early observations. Unreliable results are discarded.

As a general rule, the techniques described herein can be implemented with and flexibly applied to various kinds and types of sequential tests.

A first example of the sequential test includes a random walk. For example, a one-dimensional (1-D) random walk may be used. The random walk may include a plurality of steps. Each step may correspond to a respective observation. Each step may thus correspond to a respective iteration of the sequential test. The result of the respective observation can be a local bias of the random walk. For example, the values of the plurality of numbers may determine the position of the random walk. Each random number may increment or decrement the position of the random walk, according to its value. For example, if the bias of the random walk—i.e., a distance of the position from the starting point—exceeds a threshold, the sequential test can be marked as failed.

Sometimes, the bias of the random walk is referred to as skewness.

A second example of the sequential test includes considering of an entropy of the plurality of numbers. The entropy is generally a measure of the randomness of numbers. Hence, a larger (smaller) entropy corresponds to larger (smaller) randomness. Here, the taking of each observation may include calculating a value indicative of a Renyi-entropy measure, e.g., the min-entropy measure.

In this regard, techniques as described above can be employed. Hence, for calculating the min-entropy, the following approach can be taken: The taking of each observation may include selecting from the respectively obtained numbers the most often occurring number. Then, the count of occurrences of the selected number can be determined, as a result of the respective observation. If the most often occurring number occurs too often, this can be an indication of non-randomness of the plurality of numbers.

Again, it would be possible to check if any occurring value of the respectively obtained plurality of numbers exceeds a respective predefined threshold. Then, an upper bound of the Renyi-entropy measure may be determined.

A computer program product or a computer program includes program code that can be executed by control circuitry. Executing the program code causes the control circuitry to perform a method. The method includes sequentially obtaining a plurality of numbers from a physical RNG. The method also includes repeatedly taking observations on the respectively obtained numbers while obtaining the plurality of numbers. The observations are associated with a sequential test for randomness. The method also includes, for each observation: selectively marking the sequential test as failed depending on the result of the respective observation.

A device includes control circuitry configured to perform: sequentially obtaining a plurality of numbers from a physical RNG; while obtaining the plurality of numbers, repeatedly taking observations on the respectively generated numbers, the observations being associated with the sequential test for randomness; and for each observation, depending on a result of the respective observation, selectively marking the sequential test as failed.

It is to be understood that the features mentioned above and those yet to be explained below may be used not only in the respective combinations indicated, but also in other combinations or in isolation without departing from the scope of embodiments of the invention. For illustration, techniques described above with respect to calculating a value indicative of a Renyi-entropy measure may be applied to individual observations of a sequential test as described above.

BRIEF DESCRIPTION

Some of the embodiments will be described in detail, with references to the following Figures, wherein like designations denote like members, wherein.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described for testing the quality of physical RNGs. Techniques are described which facilitate testing a plurality of numbers sequentially obtained from a physical RNG for randomness.

The techniques described herein may be implemented as an offline test and/or as an online test.

These techniques help to test the plurality of numbers at a high statistical accuracy and with the possibility to quickly take a decision as to whether mark the respective test as failed or passed.

The techniques help to test the plurality of numbers at a high reliability. A nominal fail probability of the tests underlying the techniques described herein may be low.

Further, these techniques help to implement a test for randomness requiring limited computational resources. This again facilitates obtaining a test decision quickly.

According to examples, the techniques rely on a test including the calculation of a value indicative of a Renyi-entropy measure.

According to examples, the techniques rely on a sequential test. The sequential test includes a plurality of observations. Each observation typically operates on all numbers that have been obtained at the time of taking the respective observation. Each observation may include calculation of the value indicative of the Renyi-entropy measure. In other examples, each observation may include the calculation of a respective position of a random walk defined by the sequential test.

The particular observation that eventually leads to marking the sequential test as failed—if any—may not be known a-priori. If the sequential test is marked as failed, the quality of the physical RNG may be insufficient or, more specifically, the plurality of numbers obtained from the physical RNG may not provide any randomness.

Such a scenario of non-randomness can result from damaged physical RNGs, e.g., when not taking the appropriate measurements on an underlying physical process. Other scenarios of non-randomness include security breaches including external attacks on the integrity of an underlying system.

The techniques described herein may find application in various use cases. For example, a plurality of numbers having sufficient randomness may be required in the operation of an automated system. For example, cryptographic applications may be implemented by the automated system based on the plurality of numbers. The security of the cryptographic applications may be compromised for non-random numbers. Examples of automated systems include processors for calculation which implement a secure boot process based on the plurality of numbers; chip cards for authentication; telecommunication equipment; programmable logic controllers, control devices for railways, etc.

Figure 1:
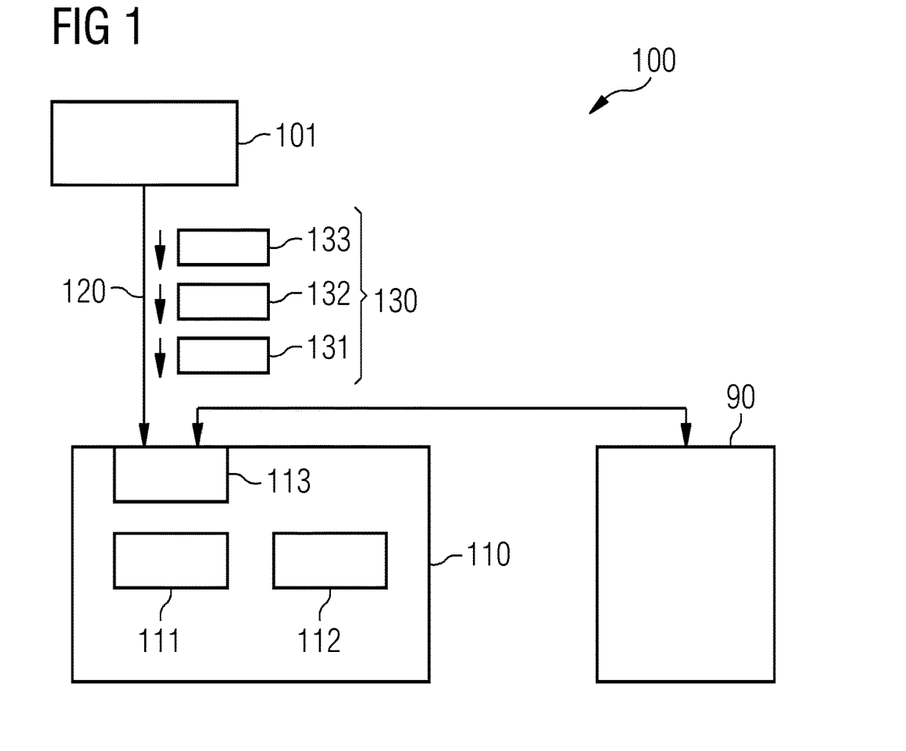
FIG. 1 schematically illustrates a system including a physical RNG and a device according to embodiments.

FIG. 1 illustrates aspects with respect to a system 100. The system 100 includes a physical RNG 101 and a device 110.

The device 110 includes an interface 113 configured to obtain a plurality of numbers 131-133—forming a respective sequence 130—from the physical RNG 101. The device 110 also includes a processor 111 and a memory 112. The processor 111 can load program code from the memory 112 and execute the program code. Based on executing the program code, the processor 111 can implement techniques with respect to testing the plurality of numbers 131-133 for randomness. The processor 111 can implement a test consisting of a single observation. The processor 111 could also implement a sequential test including a plurality of observations.

The processor 111, the memory 112, and the interface 113 implement a control circuitry of the device 110.

For example, the device 110 may be implemented as a microprocessor, a field programmable gate array (FPGA), or an application-specific integrated circuit (ASIC).

The device may be test equipment of a backend testing facility in production. Then, the device may implement offline-testing functionality.

In FIG. 1 a scenario is illustrated where the interface 113 can communicate with an automated system 90. The device may be integrated into the automated system. The device 110 may control an operation of the automated system. Then the device may implement online-testing functionality.

The automated system 90 may operate based on the plurality of numbers 131-133. For example, the automated system 90 may perform cryptographic functionality based on the plurality of numbers 131-133.

The physical RNG 101 is connected via a signaling line 120 with the device 110. In other examples, the physical RNG 101 may be internally integrated into the device 110.

Non-randomness of the sequence 130 of numbers 131-133 may result from malfunctioning of the physical RNG 101, attacks on the integrity of the system 100, e.g., by tampering with the physical RNG 101 and/or the signaling line 120.

Figure 2:
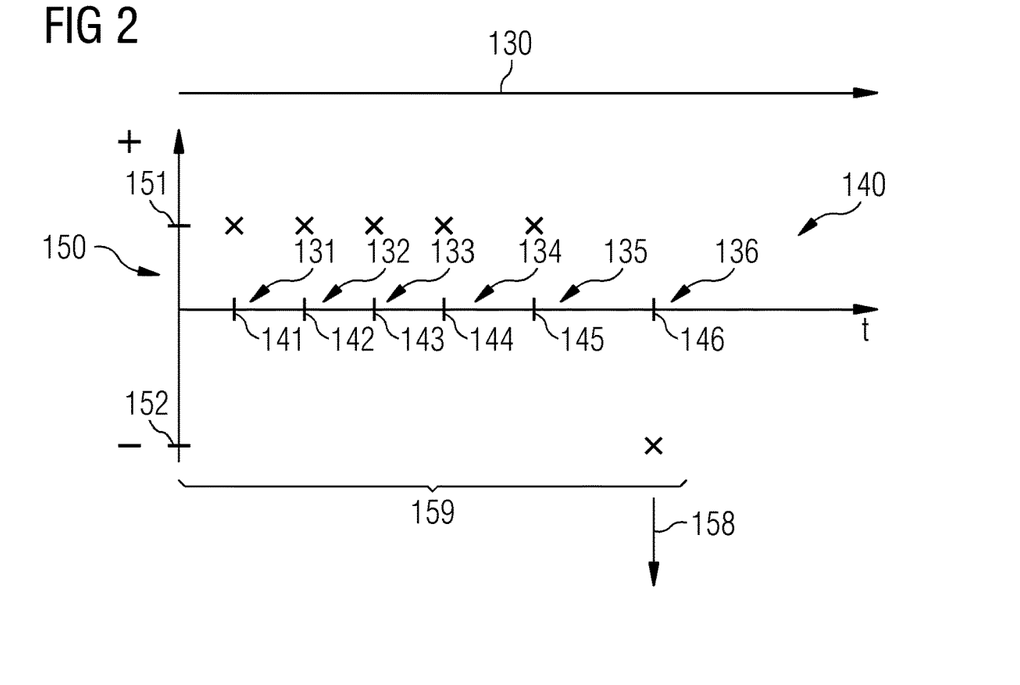
FIG. 2 schematically illustrates a sequential test for randomness of a plurality of numbers obtained from the physical RNG according to embodiments.

FIG. 2 schematically illustrates aspects with respect to the sequential test 140. The sequential test 140 includes observations 141-146. The observations 141-146 are sequentially taken over the course of time. The observations 141-146 operate on those numbers 131-136 which have been obtained at the time of taking the respective observation 141-146. Hence, the observation 145 operates on all previously obtained numbers 131-135. Likewise, the observation 146 operates on all previously obtained numbers 131-136.

As a general rule, while FIG. 2 illustrates a sequential test 140 including a plurality of observations, according to certain examples a non-sequential test 140 may be implemented which consists of a single observation (not illustrated in FIG. 2).

FIG. 2 illustrates a result 150 of the observations 141-146 as a function of the respective time at which the observations 141-146 are taken. In detail, the observations 141-145 have a positive result 151, while the observation 146 has a negative result 152. The negative result 152 of the given observation 146 leads to marking the sequential test 140 as failed. It can be assumed that the plurality of numbers 131-136 of the sequence 132 does not provide sufficient randomness.

When starting the sequential test 140 with taking the observation 141, it may a-priori not be defined that the particular observation 146 leads to marking the sequential test as failed. Hence, in other words, the count of observations 141-145 preceding the given observation 146 which results in marking the sequential test 140 as failed, is not defined a-priori. This also results in the a-priori undefined test time 159 from commencing the sequential test 140 until finishing the sequential test 140, e.g., by marking the sequential test as passed or failed.

Figure 3:
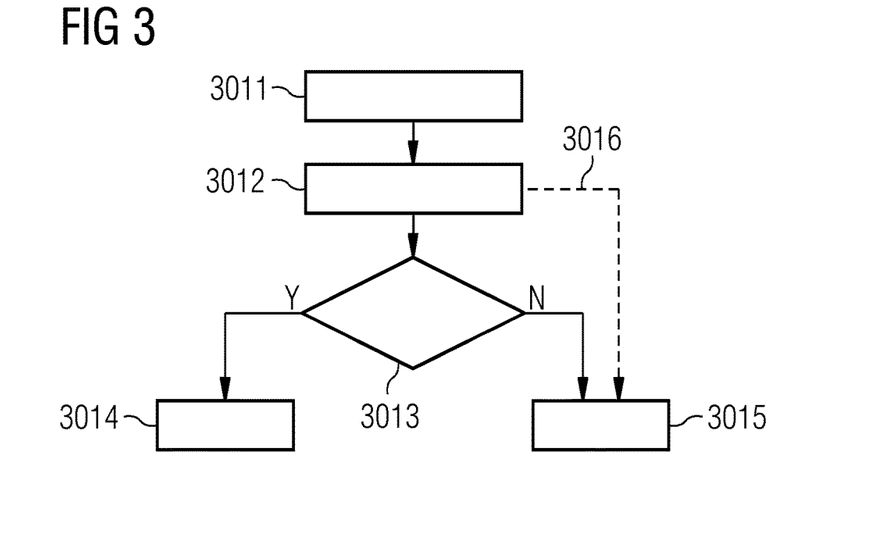
FIG. 3 is a flowchart of a method according to embodiments.

FIG. 3 is a flowchart of a method according to various examples. For example, the method according to FIG. 3 may be executed by the device 110 (cf. FIG. 1).

In block 3011, a plurality of numbers is obtained, e.g., from a physical RNG. Each number may have a corresponding value. Each number may be associated with the respective sequence number. The plurality of numbers may be obtained in a sequence. The sequence number may be indicative of the position of the respective number in the sequence.

At block 3012, an observation is taken. The observation is part of a test for randomness. For example, as part of the observation, a value indicative of an entropy measure can be calculated. Various entropy measures are available including Renyi-entropy measures such as the min-entropy.

Then, at block 3013, it is checked whether a result of the observation fulfills a certain test criterion. For example, it can be checked whether the Renyi-entropy measure is above a threshold. If the test criterion is fulfilled, then at block 3014, the test is marked as passed; otherwise, at block 3015, the test is marked as failed. If the test is marked as failed, it is possible to abort the operation of an automated system which uses the plurality of numbers, e.g., for providing cryptographic functionality.

The test of FIG. 3 may be prematurely aborted. A shortcut of the test may be implemented. This is illustrated by the dashed branch 3016 in FIG. 3. In detail, it would be possible to determine whether the value is indicative of an upper bound of the Renyi-entropy measure. Then, it may not be required to fully quantify the Renyi-entropy measure; rather, an upper bound may be determined. If the value indicates a Renyi-entropy below the upper bound, the test may be marked as failed, 3015.

Such a concept as explained in connection with FIG. 3 can be extended to be employed in connection with a sequential test including a plurality of observations. Such a scenario is illustrated in FIG. 4.

Figure 4:
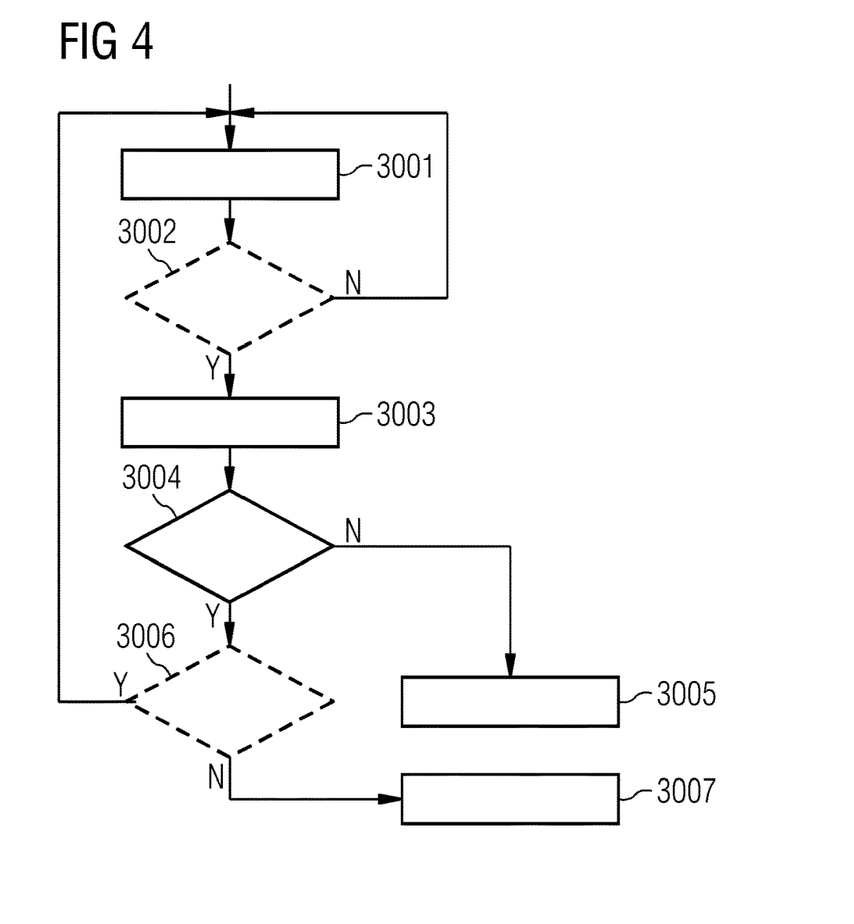
FIG. 4 is a flowchart of a method according to embodiments.

FIG. 4 is a flowchart of a method according to various examples. For example, the method according to FIG. 4 may be executed by the device 110 (cf. FIG. 1).

In FIG. 4, optional blocks are depicted using dashed lines.

At block 3001, a current number of a sequence of numbers is obtained, e.g., from a physical RNG. The current number has a certain sequence number which marks the position of the current number in the sequence.

At block 3002, it is checked whether the sequence number—i.e., the count of already obtained numbers—exceeds a certain threshold. Block 3002 is optional.

If the sequence number does not exceed the threshold, 3001 is really executed and a next number is obtained. Otherwise, the method commences at block 3003.

At block 3003, an observation of a sequential test for randomness is taken. This may involve a calculation. The calculation depends on the particular type of the sequential test. The observation is taken on any numbers previously obtained by executing block 3001. Hence, any obtained numbers may be buffered in the memory and then made subject to taking the observation at block 3003. Such a calculation of a given iteration of block 3003 may be based on one or more calculations of one or more preceding iterations of block 3003.

At block 3004, the result of the observation of the current iteration of block 3003 is compared with a predefined threshold, defining a test criterion. Depending on the comparison of block 3004, the sequential test is selectively marked as failed at block 3005. According to some examples, the threshold used at block 3004 may depend on the sequence number of the current number obtained in the current iteration of block 3001. In other words, the threshold used in block 3004 may depend on the count of obtained numbers. The threshold can be adjusted from iteration to iteration of block 3004 accordingly.

For example, the threshold associated with the observations taken in multiple iterations of block 3003 may correspond to a nominal failure probability of the sequential test—i.e., to a probability of executing block 3005—which does not vary more than 50% across the observations, optionally not more than 20%, further optionally not more than 5%, taking into account the different decision basis for different iterations of 3003, 3004, specifically the varying count of numbers on which the respective observation operates.

As illustrated above, when applying a test while obtaining numbers from a physical RNG during operation, a general tendency is that testing with higher accuracy is possible based on a larger count of numbers; on the other hand, it is often desired to test the quality of a physical RNG quickly. According to the techniques described herein, by employing a sequential test including multiple iterations, significant defects of the physical RNG can be detected quickly in early iterations, while less severe defects can be detected at later iterations at high accuracy. Thus, there may be a tendency to implement coarse testing in a first stage and fine testing in the subsequent, second stage. This can be achieved by adjusting the test criterion, as described above.

If the test criterion at 3004 is fulfilled, then, at 3006 it can be checked whether a further number needs to be obtained by a further iteration of block 3001. If this is not the case, then the sequential test is marked as passed in block 3007.

There are various measures that can be taken when marking the sequential test as failed in block 3005. For example, the operation of an automated system using the plurality of numbers may be aborted. In another scenario, obtaining of the plurality of numbers—i.e., further iterations of 3001—is aborted. Optionally, the generation of the plurality of numbers may be aborted, as well. More detailed statistical tests may be applied to the physical RNG as well, in order to determine its problems in more details.

There are various tests for statistical randomness available to be used in the context of the techniques described herein. Examples include a random walk sequential test. Further examples include a test including the calculation of a value indicative of an entropy measure, specifically a Renyi-entropy measure such as the min-entropy.

Random Walk Test

The stochastic model of some physical RNGs suggests that a typical problem affecting the quality is the bias. The bias is typically defined as the difference between the factual probability of 1-bits and the ideal probability of ½. In such scenarios, a high accuracy test for randomness may be implemented by testing the bias.

The bias can be tested using a sequential test implemented by a random walk. Initially, at the first step of the random walk, the position of the random walk is 0. Each subsequent number affects the position of the random walk. In the scenario of a 1-bit number, a "1" increments the position and a "0" decrements the position, each time by a step size of "1". Multi-bit numbers would also be possible, thereby incrementing/decrementing the position accordingly.

Figure 5:
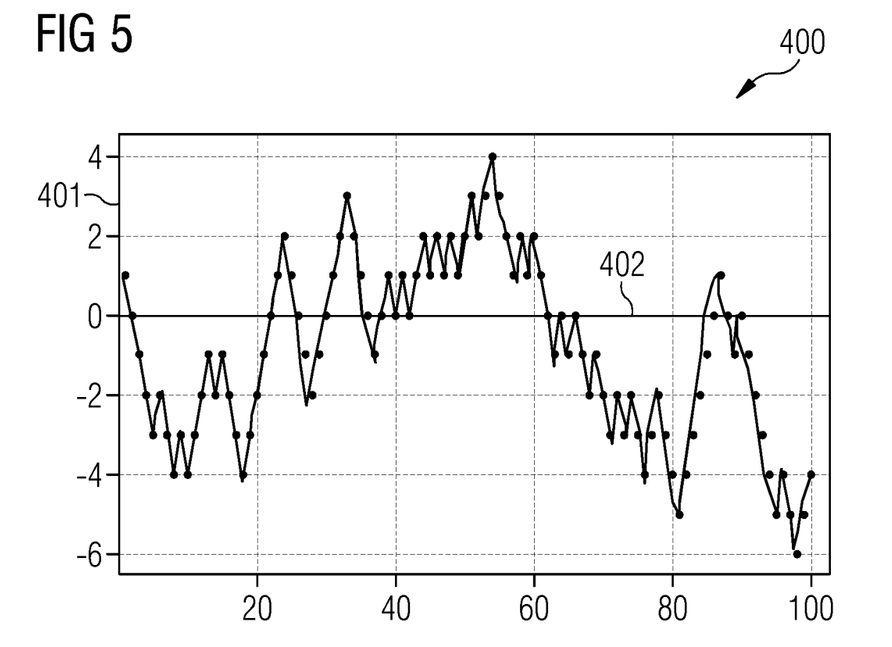
FIG. 5 graphically illustrates a sequential test including a random walk according to embodiments.

FIG. 5 illustrates the position 401 of the random walk 400 as a function of the iteration of the sequential test, i.e., as a function of the respective sequence number 402. Each sequence number corresponds to a respective discrete point in time. The underlying physical RNG had 0 bias.

The count of 1-bits at a given point in time and the position 401 correspond to each other and can be derived from each other.

An excessive number of 1-bits and, hence, the respective bias could be detected by the position 401 of the random walk 400 taking excessively positive values for the preceding iterations 402. An excessive number of 0-bits and, hence, the respective bias, could be detected by the position 401 of the random walk 400 taking excessively negative values for the preceding iterations 402. Both scenarios can be covered by considering the absolute value of the position 401. This is illustrated in FIG. 6.

Figure 6:
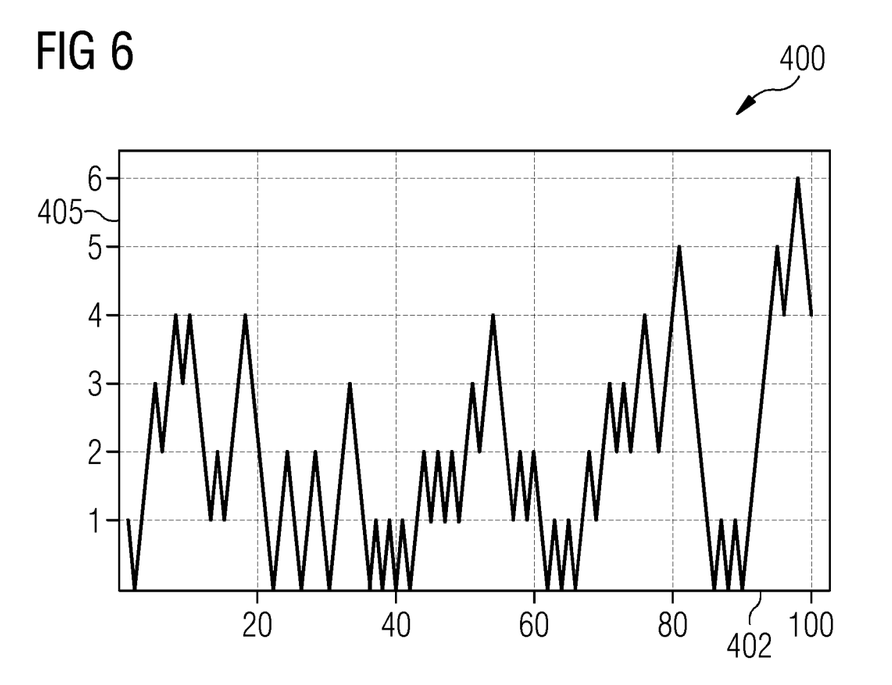
FIG. 6 graphically illustrates the sequential test of FIG. 5 in further detail.

FIG. 6 illustrates the absolute value 405 of the position 401 of the random walk 400 according to the example of FIG. 5.

An advantage of the representation of the sequence of numbers according to FIG. 6 is that problems associated with too many 1-bits and too many 0-bits can be processed together. For this, at a given iteration 402 of the random walk 400, the absolute value 405 of the position 401 is compared with a threshold. The threshold may depend on the iteration 402. If the absolute value 405 exceeds the threshold, this may result in marking the sequential test is failed due to non-randomness. Otherwise, the sequential test can proceed with the next observation.

This finding is illustrated in further detail with respect to the subsequent FIGS. which illustrate examples.

FIG. 7 again illustrates the absolute value 405 of the position 401 of a random walk 400 as a function of the iteration 402, and furthermore illustrates the respective threshold 410. As illustrated, the threshold 410 that leads to selective marking of the sequential test as failed depends on the iteration 402.

Figure 7:
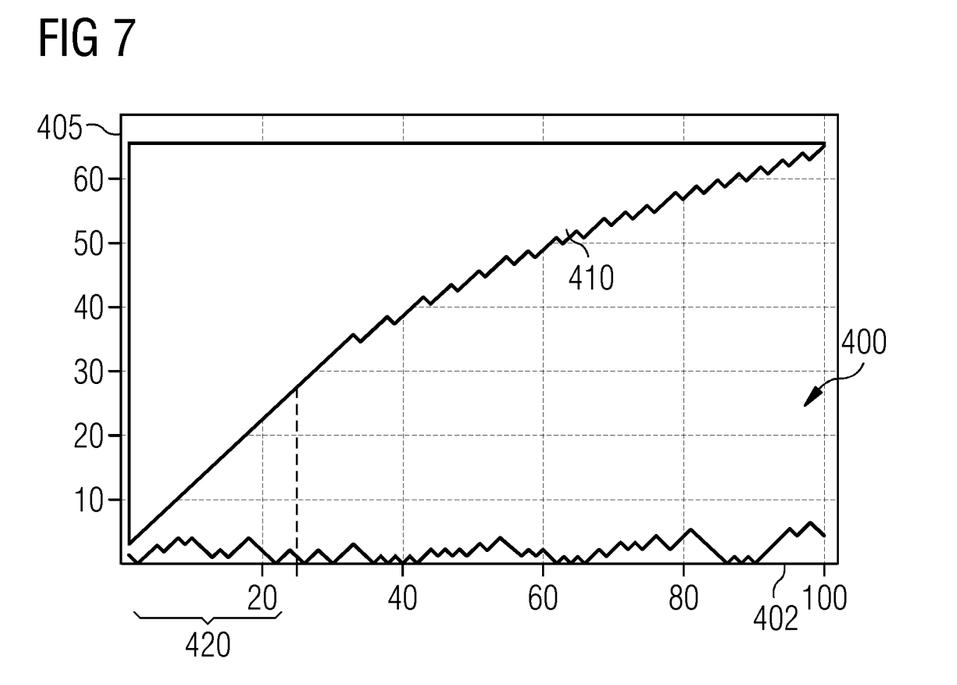
FIG. 7 graphically illustrates the sequential test of FIG. 5 in further detail.

The threshold 410 is selected such that for each iteration 402, an ideal RNG without bias encounters a certain nominal fail probability, e.g., $2 \times 10^{-10}$. This implies that for certain small sequence numbers/early iterations 402, arranged within a certain range 420, the threshold 410 cannot be reached. Hence, it is possible to delay commencing of the sequential test until the lower threshold 420 has been reached.

Figure 8:
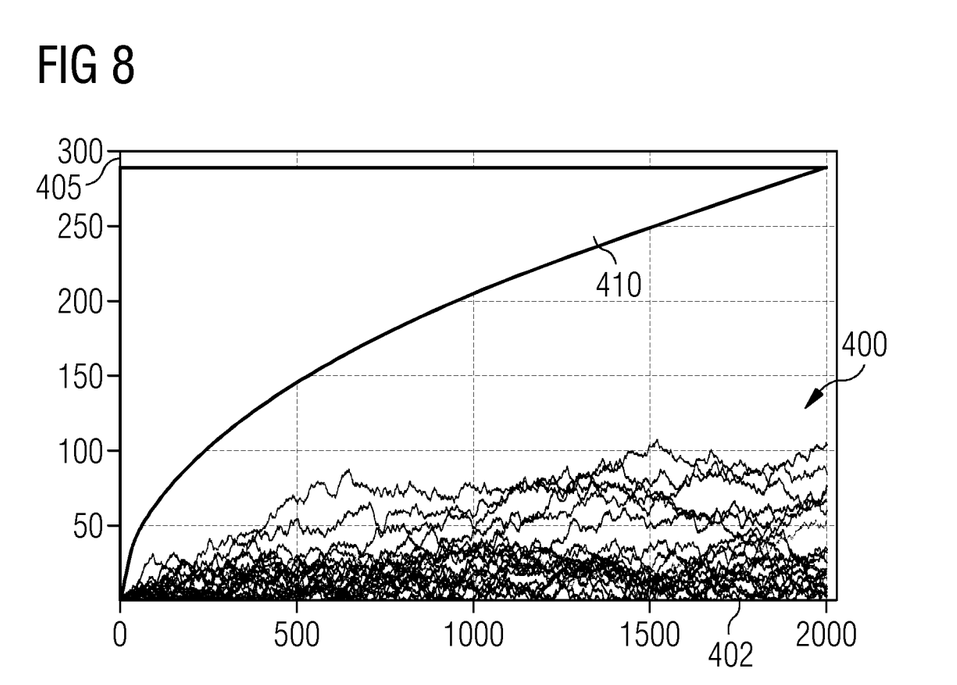
FIG. 8 graphically illustrates the sequential test of FIG. 5 in further detail.

FIG. 8 illustrates random walks 400 for 20 sequences of numbers generated by respective RNGs without bias. As illustrated, none of the respective sequential tests fail, because the threshold 410 is not reached by the absolute positions 405 of the random walks 400.

Figure 9:
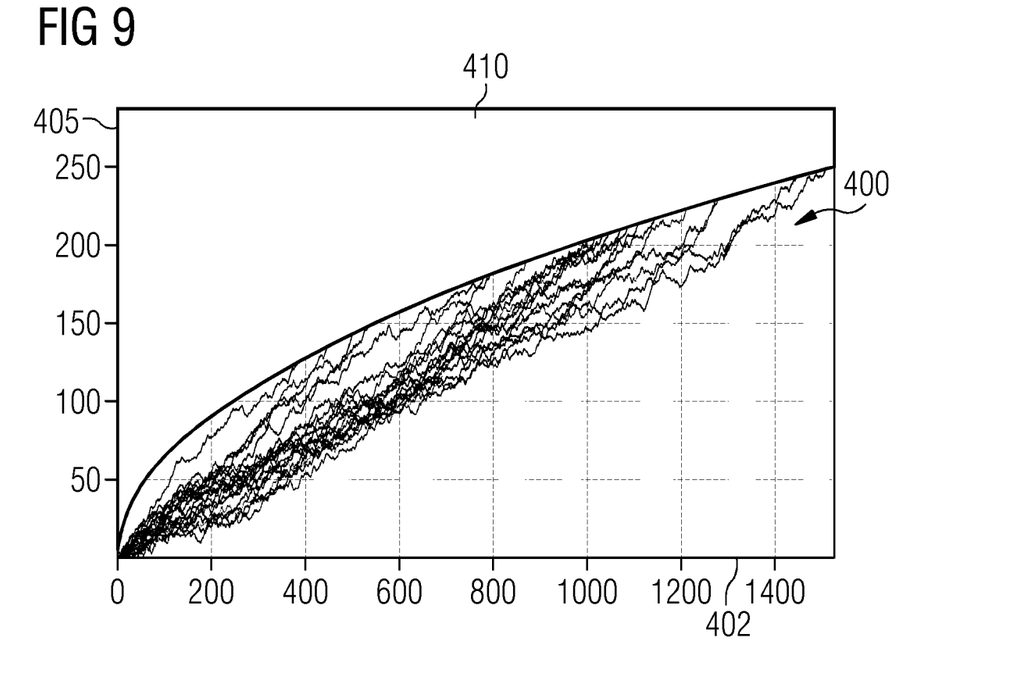
FIG. 9 graphically illustrates the sequential test of FIG. 5 in further detail.

FIG. 9 illustrates random walks 400 for 20 sequences of numbers generated by respective RNGs having a bias of 10%. Hence, the quality of the RNG is not ideal. As illustrated, the absolute positions 405 of all random walks 400 reach the threshold 410, the first random walk 400 at iteration #380 and the last random walk 400 at iteration #1499.

Figure 10:
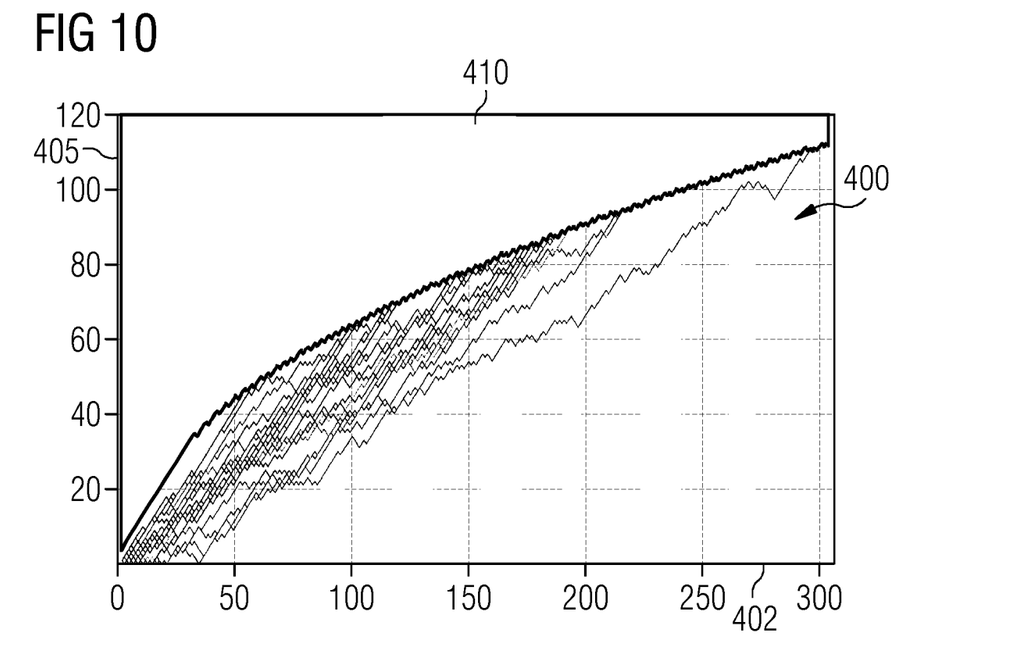
FIG. 10 graphically illustrates the sequential test of FIG. 5 in further detail.

FIG. 10 generally corresponds to FIG. 9, however, the RNGs have a bias of 25%. Here, the absolute positions 405 reach the threshold 410 between iterations #58 and #299. A comparison of FIGS. 8 and 9 illustrates that more significant problems of the RNGs can be detected faster.

Entropy Test

A further test that can be used includes calculating an entropy measure. The statistical randomness of a sequence of A numbers can be tested, wherein each number can take w different values. i=1 . . . A is the sequence number.

The Renyi-entropy is given by $$H_\alpha(X) = \frac{1}{1-\alpha} \log\left(\sum_{i=1}^{A} p_i^\alpha\right)$$

for $\alpha>0$, $\alpha \neq 1$, and $p_i$ denotes the probability of the values w. The min-entropy is obtained from this equation by $\alpha \to \infty$.

Then, for each possible value w, a counter $z_w$ can be implemented. All counters are initially set to 0.

Then, for each i, the counter $z_w$ corresponding to the respective number is incremented by 1. After processing all numbers, each counter $z_w$ indicates how often the respective value occurred. The counter values can be used to determine $p_i$.

After processing all A numbers, the maximum M of the counter values $z_w$ is determined. This corresponds to selecting, from the available numbers, the most often occurring value. Next, the count of occurrences of the most often occurring value can be determined. This is related to the result of the entropy measure. The test can be marked as passed if M<S, where S is a predefined threshold. Otherwise, the test can be marked as failed (cf. FIG. 3, block 3013).

Based on this, the memory 112 and the location of the counters in the memory 112 are to be dimensioned such that overflows are avoided. For example, the maximum possible counter value is A (if all numbers take the same value). However, it would be possible to pre-maturely abort the test. For example, it would be possible to check if any occurring value of the plurality of numbers exceeds a predefined buffer threshold B. Then, this can be used to shortcut the test (cf. FIG. 3: branch 3016) —i.e., it is not required to process all numbers A. For example, if one or more occurring values of the plurality of numbers exceed the predefined buffer threshold, then the test can be marked as failed. For example, if one or more values of the plurality of numbers exceed the predefined buffer threshold B, this may be indicative of a comparably small Renyi-entropy measure. Specifically, this may be indicative of a comparably small min-entropy measure. Hence, by using the buffer threshold B, it is possible to determine an upper bound for the entropy measure.

As a general rule, it is possible that $B \neq S$. For example, B>S is possible. Hence, the entropy corresponding to the predefined threshold S may be greater than the entropy corresponding to the buffer threshold B. Such techniques based on a value indicative of the Renyi-entropy or specifically the min-entropy help to implement a reliable test for randomness with limited computational resources such as processing power and memory size. It has been found that by calculating a value indicative of an entropy measure, specifically indicative of a min-entropy measure and an upper bound thereof, it is possible to obtain a reliable indication of whether the plurality of numbers provide for randomness.

Figure 11:
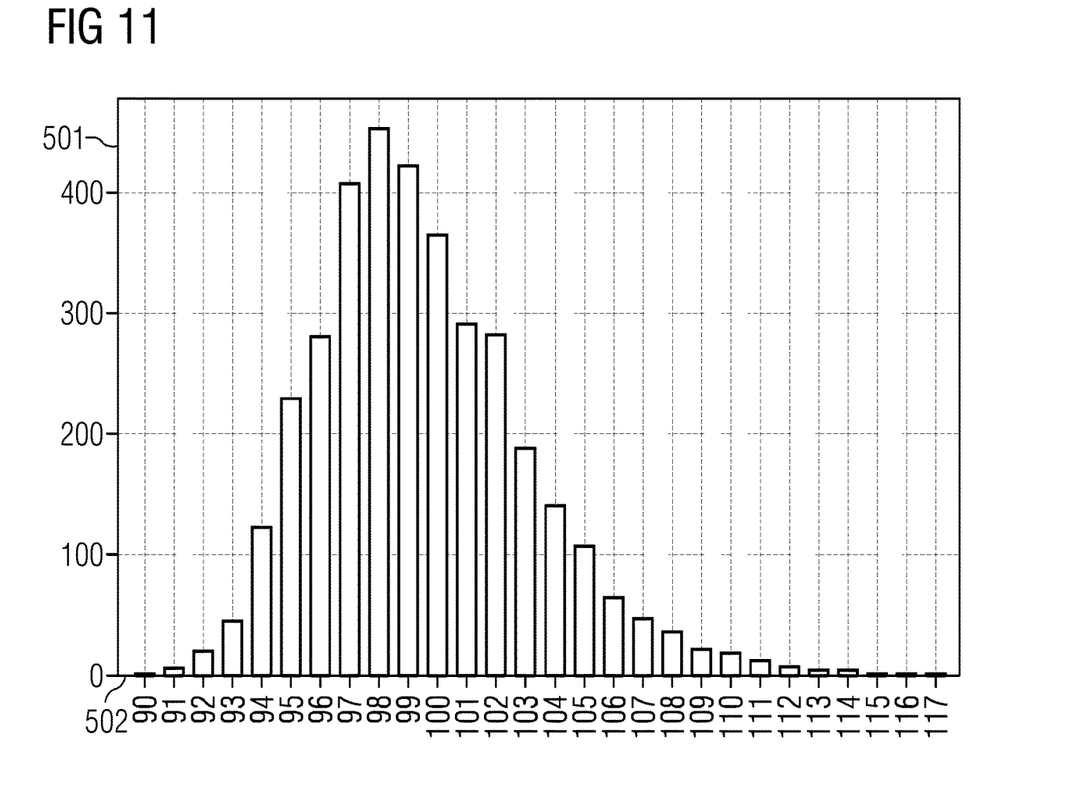
FIG. 11 graphically illustrates a given observation of a test including calculation of a value indicative of a min-entropy according to various examples.

FIG. 11 illustrates an example implementation.

In FIG. 11, A=70,000 numbers are tested. Each number is a 10-bit word such that each number can take 1024 different values.

In FIG. 11, counters are used which can have, at maximum, a value of 255. If one of the counters has a value of B=256, the test is marked as failed.

If the test processes all A=70,000 numbers, it is then determined, if there is a counter that has a value which is larger than S=165. In this case the test is marked as passed; otherwise as failed.

A test is run for $250 \times 10^6$ data sets of 32 bits each, out of which only 10 are tested at a fixed position. There has not been a premature abort of the test due to overflow of the one of the counters; hence, the test was executed 3571 times. FIG. 11 illustrates the distribution of the 3571 maximum counter values. FIG. 11 illustrates the number of occurrences 501 of a maximum counter value 502 for the 3571 tests.

As illustrated, the maximum values all stay significantly below the threshold of S=165. The random numbers are better than required by the test.

To avoid excessive memory allocation, the test may be aborted and marked as failed once any one of the values 502 has a count that reaches a buffer threshold B that may generally be larger than the threshold S.

If the test is passed, then there is a small probability for a min-entropy that is smaller than a given threshold. As such, executing a test according to FIG. 11 corresponds to calculating a value which is indicative of the min-entropy.

This finding is motivated hereinafter. The test provides a mathematically provable indication of the statistical quality of the tested numbers: if the test is passed, then the probability of the min-entropy in the 10 bits to be smaller than 8 bits is smaller than 8.98800661475519897770101678567252792121814385746255001507106*10^-13.

The line of argumentation is as follows. If the min-entropy is smaller than 8 bits, then there is a 10 bit value which occurs at a probability of more than 1/256.

Based on the binomial distribution, the cumulative probability that an event of probability 1/256 occurs in A=70,000 repetitions S=165 or less times is 8.98800661475519897770101678567252792121814385746255001507106456821073*10^-13. The probability that a counter has a value larger than 165 is 0.9999999999910119933852448010222989832143274720. If the probability of the occurrence of a 10-bit pattern is larger than 1/256, then the probability of the false-positive test is smaller than 8.98800661475519897770101678567252792121814385746255001507106458210073*10^-13.

A min-entropy of less than 8 bits is therefore detected with a large probability. Therefore, it can be assumed that a positively-passed test provides a plurality of numbers with at least 8-bits of min-entropy.

To obtain a respective sequential test, multiple observations relying on the value indicative of the Renyi-entropy or specifically the min-entropy can be taken while obtaining the numbers (cf. FIG. 4). This is discussed next.

Again, as already indicated above, a value indicative of the min-entropy of numbers having 10-bit length is calculated. This is done for each observation of the sequential test. Each observation operates on a different count of numbers, because the sequential test is executed while obtaining the numbers. The calculation described above in connection with FIG. 11 is performed for each observation. Hence, for each observation, the count of the most often occurring value of the respective numbers is determined, possibly with applying the shortcut.

The test criterion is set such that a min-entropy of 9.5 bits per 10 bit number is required. The threshold S is set such that for such a physical RNG, an excessive occurrence of a 10-bit value at a given number results with a probability of $10^{-10}$ in marking the test as failed. Generally, the threshold S can thus be set based on the count of numbers and the desired reliability. Because the probability of the most often occurring value in case of a 9.5 min-entropy is $2^{-9.5}$, there can only be 724 such numbers such that the probability of excessive occurrence of any value in a given 10-bit number is smaller than $724 \times 10^{-10}$.

For the first three numbers obtained from the physical RNG, no observations are taken. The probability of the first four numbers having the same value is $724*2^{-4*9.5}=2.63\times 10^{-9}$. If the first four numbers have the same value, the test can be marked as failed (S=4).

The test is also marked as failed if the first five or first six numbers include any value which occurs more than 4-times (S=4).

Starting from an observation taken on the first seven numbers, the threshold is incremented to mark the test as failed if any value occurs more than five times (S=5). The next increment of the threshold to S=6 occurs at the sequence number #20, etc. Thereby, it is possible to adjust the threshold not for each iteration of the sequential test, but rather for a subset of all iterations.

Next, examples of sequential tests relying on values indicative of the min-entropy are described. A=70,000 numbers are generated, each number having a 10-bit value. The numbers were generated with a given min-entropy.

From the discussion above, it follows that for a min-entropy of 0 bits, i.e., all numbers having the same value, the test is marked as failed at iteration #4.

Figure 12:
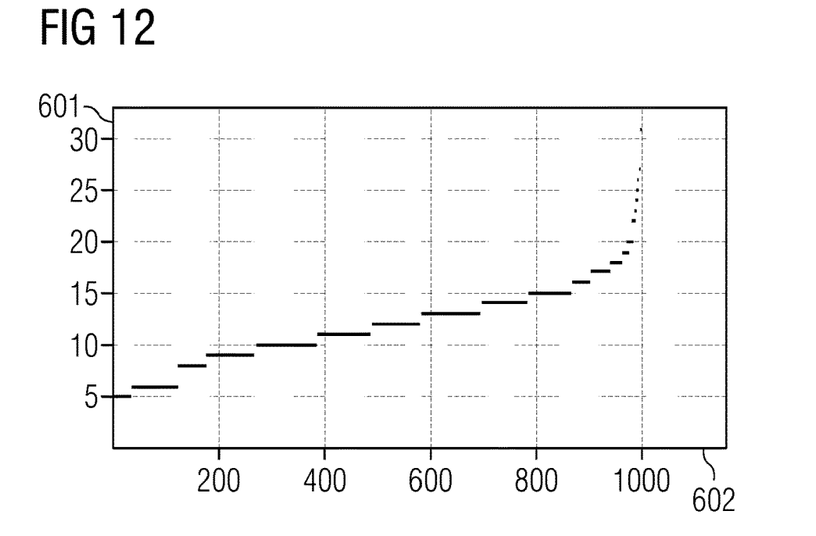
FIG. 12 graphically illustrates multiple observations of the test according to FIG. 11.

FIG. 12 illustrates the number of observations required to mark the sequential test as aborted. FIG. 12 plots a distribution of the count of observations (601) required to mark the sequential test as aborted for 1,000 sets 602 of A=70,000 numbers each. In FIG. 12, the min-entropy of the numbers was set to E=1. As illustrated in FIG. 12, the sequential test was marked as failed not earlier than after #5 observations and not later than after #31 observation. On average, #11.764 observations were required until marking the test as failed.

Figure 13:
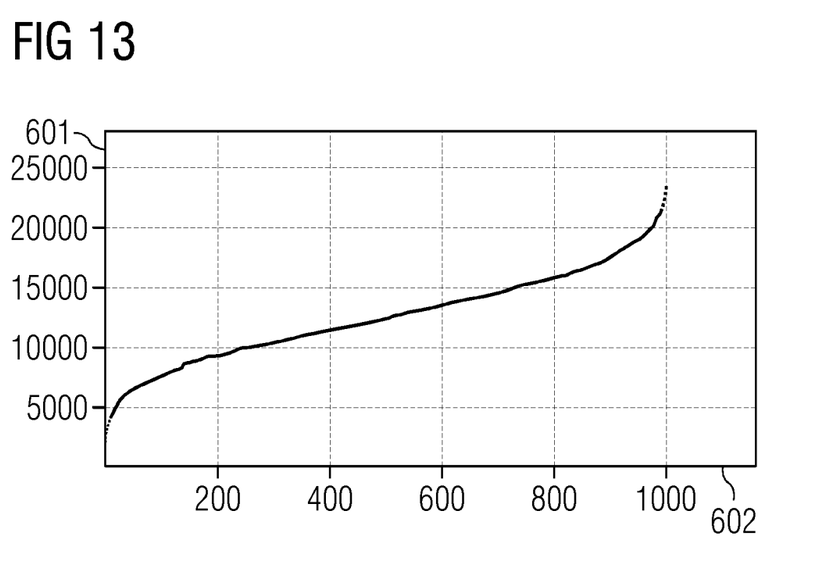
FIG. 13 graphically illustrates multiple observations of the test according to FIG. 11.

FIG. 13 generally corresponds to FIG. 12, but for a min-entropy of E=8. As illustrated, the sequential test was marked as failed not earlier than after #2407 observations and not later than after #27110 observations. On average, #12660 observations were required.

Figure 14:
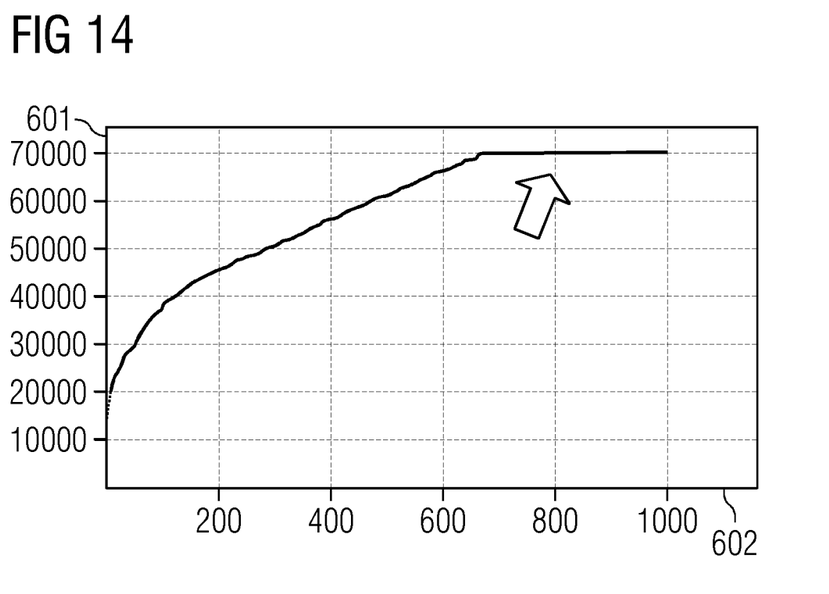
FIG. 14 graphically illustrates multiple observations of the test according to FIG. 11.

FIG. 14 generally corresponds to FIG. 12 and FIG. 13, but for a min-entropy of E=8,7. Here, the test was marked as failed not earlier than after #13683 observations. The arrow in FIG. 14 indicates sets of A=70,000 numbers each in which the test was not marked as failed at all, i.e., was marked as passed.

Summarizing, the following examples have been described:

EXAMPLE 1

A Method, Comprising obtaining a plurality of numbers (131-136) from a physical random number generator (101),
taking at least one observation (141-146) on the plurality of numbers (131-136), the at least one observation (141-146) being associated with a test for randomness,
depending on a result (150, 151, 152) of the at least one observation (141-146), selectively marking the test as failed, and
controlling an operation of an automated system depending on whether the test is marked as failed,
wherein said taking of the at least one observation (141-146) comprises:
calculating a value indicative of a Renyi-entropy measure for the plurality of numbers (131-136).

EXAMPLE 2

The Method of Example 1 wherein the Renyi-entropy measure comprises a min-entropy measure.

EXAMPLE 3

The Method of Examples 1 or 2 wherein said taking of the at least one observation (141-146) comprises:
selecting the most often occurring value of the plurality of numbers (131-136),
determining the count of the selected value as the result (150, 151, 152) of the at least one observation (141-146).

EXAMPLE 4

The Method of Any One of the Preceding Examples, Further Comprising comparing the result (150, 151, 152) of the at least one observation (141-146) with a predefined threshold,
wherein the test is selectively marked as failed depending on said comparing.

EXAMPLE 5

The Method of Any One of the Preceding Examples wherein said controlling of the operation of the automated system comprises aborting the operation of the automated system (90) using the plurality of numbers (131-136) in response to marking the test as failed.

EXAMPLE 6

The Method of Any One of the Preceding Examples wherein said taking of the at least one observation (141-146) comprises:
checking if any occurring value of the plurality of numbers (131-136) exceeds a respective predefined buffer threshold.

EXAMPLE 7

The Method of Example 3, and of Examples 4 or 5, and of Example 6 wherein the entropy corresponding to the predefined threshold is greater than the entropy corresponding to the predefined buffer threshold.

EXAMPLE 8

The Method of Any One of the Preceding Examples wherein the value is indicative of an upper bound of the Renyi-entropy measure.

EXAMPLE 9

A Device (110) Comprising Control Circuitry (111, 112, 113) Configured to Perform obtaining a plurality of numbers (131-136) from a physical random number generator (101),
taking at least one observation (141-146) on the plurality of numbers (131-136), the at least one observation (141-146) being associated with a test for randomness,
depending on a result (150, 151, 152) of the at least one observation (141-146), selectively marking the test as failed, and
controlling an operation of an automated system depending on whether the test is marked as failed,
wherein said taking of the at least one observation (141-146) comprises:
calculating a value indicative of a Renyi-entropy measure for the plurality of numbers (131-136).

EXAMPLE 10

The Device (110) of Example 9 wherein the control circuitry (111, 112, 113) is configured to perform the method of any one of examples 1-8.

EXAMPLE 11

A System (100), Comprising the device (110) of examples 9 or 10, and
the physical random number generator (101).

EXAMPLE 12

A Method, Comprising sequentially obtaining a plurality of numbers (131-136) from a physical random number generator (101),
while obtaining the plurality of numbers (131-136): repeatedly taking observations (141-146) on the respectively obtained numbers (131-136), the observations (141-146) being associated with a sequential test (140) for randomness, and
for each observation (141-146): depending on a result (150, 151, 152) of the respective observation (141-146), selectively marking the sequential test (140) as failed.

EXAMPLE 13

The Method of Example 12 wherein a given observation (141-146) results in marking the sequential test (140) as failed,
wherein the count of observations (141-146) preceding the given observation (141-146) is not defined a-priori.

EXAMPLE 14

The Method of Examples 12 or 13, Further Comprising for each observation (141-146): comparing the result (150, 151, 152) of the respective observation (141-146) with a respective predefined threshold, wherein the sequential test (140) is selectively marked as failed depending on said comparing.

EXAMPLE 15

The Method of Example 14 wherein, for each observation (141-146), the respective predefined threshold depends on the count of obtained numbers (131-136) associated with the respective observation (141-146).

EXAMPLE 16

The Method of Examples 14 or 15 wherein the predefined thresholds associated with the observations (141-146) correspond to a nominal fail probability of the sequential test (140) which does not vary more than 50% across the observations (141-146), optionally not more than 20%, further optionally not more than 5%.

EXAMPLE 17

The Method of Any One of Examples 12-15 wherein the sequential test (140) comprises a random walk (400) having a plurality of steps, each step corresponding to a respective observation (141-146), the result (150, 151, 152) of the respective observation (141-146) being a local bias of the random walk.

EXAMPLE 18

The Method of Any One of Examples 12-17 wherein said taking of each observation (141-146) comprises:
calculating a value indicative of a Renyi-entropy measure.

EXAMPLE 19

The Method of Example 18 wherein the Renyi-entropy measure comprises a min-entropy measure.

EXAMPLE 20

The Method of Any One of Examples 12-19 wherein said taking each observation (141-146) comprises:
selecting, from the respectively obtained numbers (131-136), the most often occurring value of the obtained numbers (131-136),
determining the count of the selected value as the result (150, 151, 152) of the respective observation (141-146).

EXAMPLE 21

The Method of Any One of Examples 12-20, Further Comprising commencing to repeatedly take the observations (141-146) when the count of the respectively obtained number exceeds a threshold (420).

EXAMPLE 22

The Method of Any One of Examples 12-21, Further Comprising controlling an operation of an automated system (90) using the plurality of numbers (131-136) depending on whether the sequential test (140) is marked as failed.

EXAMPLE 23

The Method of Any One of Examples 12-22, Further Comprising in response to marking the sequential test (140) as failed, aborting said obtaining of the plurality of numbers (131-136).

EXAMPLE 24

A Device (110) Comprising Control Circuitry (111, 112, 113) Configured to Perform sequentially obtaining a plurality of numbers (131-136) from a physical random number generator (101),
while obtaining the plurality of numbers (131-136):
repeatedly taking observations (141-146) on the respectively generated numbers (131-136), the observations (141-146) being associated with a sequential test (140) for randomness,
for each observation (141-146): depending on a result (150, 151, 152) of the respective observation (141-146), selectively marking the sequential test (140) as failed.

EXAMPLE 25

A System (100), Comprising the device (110) of example 24, and
the physical random number generator (101).

EXAMPLE 26

The Device (110) of Example 24 wherein the control circuitry (111, 112, 113) is configured to perform the method of any one of examples 12-23.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:
1. A method, comprising:
providing a device comprising control circuitry configured to perform:
sequentially obtaining a plurality of numbers from a physical random number generator;
while obtaining the plurality of numbers, repeatedly taking observations on the respectively obtained numbers, the observations being a Renyi-entropy measure associated with a sequential test for randomness, wherein the sequential test for randomness include checking if a count of an occurring value of the Renyi-entropy measure exceeds a respective predefined buffer threshold;
for each observation: if the count of the occurring value of the Renyi-entropy measure exceeds the respective predefined buffer threshold, selectively marking the sequential test as failed; and
controlling an operation of an automated system depending on whether the sequential test is selectively marked as failed; and
providing a physical random number generator;
sequentially obtaining a plurality of numbers from the physical random number generator;
while obtaining the plurality of numbers, repeatedly taking observations on the respectively obtained numbers by the device, the observations being a Renyi-entropy measure associated with a sequential test for randomness, wherein the sequential test for randomness include checking if a count of an occurring value of the Renyi-entropy measure exceeds a respective predefined buffer threshold;
for each observation: if the count of the occurring value of the Renyi-entropy measure exceeds the respective predefined buffer threshold, selectively marking the sequential test as failed; and
controlling, by the device, an operation of an automated system depending on whether the sequential test is selectively marked as failed.

2. The method of claim 1, wherein a given observation results in marking the sequential test as failed, further wherein a count of observations preceding the given observation is not defined a-priori.

3. The method of claim 2, further comprising:
for each observation: comparing the result of the respective observation with a respective predefined threshold, wherein the sequential test is selectively marked as failed depending on the comparing.

4. The method of claim 3, wherein for each observation, the respective predefined threshold depends on a count of obtained numbers associated with the respective observation.

5. The method of claim 4, wherein the predefined thresholds associated with the observations correspond to a nominal fail probability of the sequential test which does not vary more than 50% across the observations.

6. The method of claim 1, wherein the sequential test comprises a random walk having a plurality of steps, each step corresponding to a respective observation, the result of the respective observation being a local bias of the random walk.

7. The method of claim 1, wherein the Renyi-entropy measure comprises a min-entropy measure.

8. The method of claim 1, wherein the taking each observation comprises:
selecting, from the respectively obtained numbers, the most often occurring value of the obtained numbers; and
determining a count of the selected value as the result of the respective observation.

9. The method of claim 1, further comprising:
commencing to repeatedly take the observations when a count of the respectively obtained number exceeds a threshold.

10. The method of claim 1, further comprising:
in response to marking the sequential test as failed, aborting the obtaining of the plurality of numbers.

11. A system, comprising:
a device comprising control circuitry configured to perform:
sequentially obtaining a plurality of numbers from a physical random number generator;
while obtaining the plurality of numbers, repeatedly taking observations on the respectively obtained numbers, the observations being a Renyi-entropy measure associated with a sequential test for randomness, wherein the sequential test for randomness include checking if a count of an occurring value of the Renyi-entropy measure exceeds a respective predefined buffer threshold;
for each observation: if the count of the occurring value of the Renyi-entropy measure exceeds the respective predefined buffer threshold, selectively marking the sequential test as failed; and
controlling an operation of an automated system depending on whether the sequential test is selectively marked as failed; and
a physical random number generator.

* * * * *